UNITED STATES PATENT OFFICE.

PHILIP M. SHARPLES, OF WEST CHESTER, PENNSYLVANIA, ASSIGNOR TO WHITE HEAT PRODUCTS COMPANY, OF PLANEBROOK, PENNSYLVANIA, A CORPORATION OF PENNSYLVANIA.

PROCESS OF MAKING ARTIFICIAL STONE.

1,273,547. Specification of Letters Patent. Patented July 23, 1918.

No Drawing. Application filed February 2, 1918. Serial No. 215,141.

*To all whom it may concern:*

Be it known that I, PHILIP M. SHARPLES, a citizen of the United States, and a resident of West Chester, in the county of Chester and State of Pennsylvania, have invented an Improved Process of Making Artificial Stone, of which the following is a specification.

My invention relates to the manufacture of artificial stone by the use of heated mineral substances of various characters, depending upon the uses to which the products are to be put, and my primary object is to prevent the production of the distortions and irregularities in the structure of the products which commonly result from heat used and gases developed or expanded in the process of manufacture.

In the manufacture of products from silica as a body and glass as a binder, for example, great difficulty has been experienced by reason of the fact that the heat used in the process of manufacture causes such products to swell, resulting in the specified undesirable distortion in the forms and porosity or irregularities in structures.

I discovered that by grinding or crushing such products, which had been subjected to the temperatures necessary to fuse the binder, and incorporating the disintegrated materials in molded and pressed articles, such articles could be heated so as to produce the desired fusion of the binder without such distortions and structural irregularities.

The characteristic idea of my invention is to mix or use a mixture of disintegrated prefired or preheated mineral substances for forming the bodies of the articles and disintegrated prefired or preheated mineral substances for forming permanent binders, preferably with sufficient viscous material to form a temporary binder and produce the articles by forming, pressing and evenly heating such mixture, the temperature being sufficient to fuse the binder and the pressure being of the degree required by the desired quality in the finished articles and being applied after as well as before heating if desirable for any reason.

In the practice of my invention, a satisfactory mixture consists of 90 per cent. of preheated disintegrated silica sand and 10 per cent. of disintegrated glass, held together by any suitable adhesive or temporary binder such as molasses or stale beer, the preheating being suitably of such character as would be required in producing the final artificial stone product (say 2000 degrees F. in the case of a glass binder) and being understood to drive off matter that would otherwise form gas within the articles in the final heating operation or fusion of the binder to weld the body particles together.

I do not, however, confine myself to the use of such natural elements as silica sand since corundum or emery, for instance, may be used in place thereof, or I may use such artificial substances produced by heat as carborundum, alundum and electrite, for example, and I may use mineral binders other than glass, as slag, for example, all such mineral substances having been subjected to heat either in their artificial production or their preparation for incorporation in the "mix" which is to be formed and heated for the production of the articles required.

It will be understood that the proportions of ingredients used may be varied within comparatively wide limits.

Having described my invention, I claim:

1. The process of making artificial stone which consists in mixing a prefired mineral body and a prefired mineral binder, and forming, pressing and heating the mixture to substantial fusion of the binder.

2. The process of making artificial stone which consists in heating and disintegrating a mineral substance for forming the body thereof, mixing a preheated and disintegrated mineral binding substance therewith, forming and pressing the mixed ingredients, and subjecting the formed and pressed product to heat adapted to fuse the binder.

3. The process of making artificial stone which consists in heating a natural mineral substance so as to drive off gas, disintegrating the prefired substance, mixing said substance with a prefired and disintegrated mineral binder, forming and pressing the mixture, and heating the product to fusion of said binder.

4. The process of making artificial stone which consists in mixing preheated disintegrated silica sand and disintegrated glass, and forming, pressing and heating the mixture, said heating being of such degree as to fuse the glass.

In testimony whereof I have hereunto set my name this 28 day of January, 1918.

PHILIP M. SHARPLES.